Sept. 13, 1949.   R. W. HASTINGS   2,481,662
WATER COOLER
Filed May 6, 1943   2 Sheets-Sheet 2
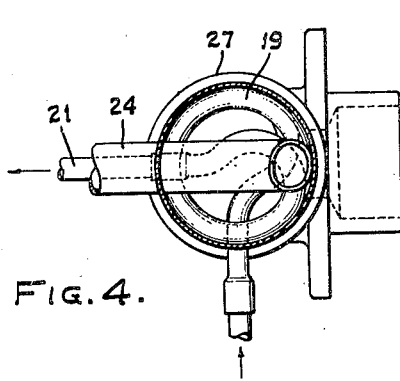
FIG. 4.
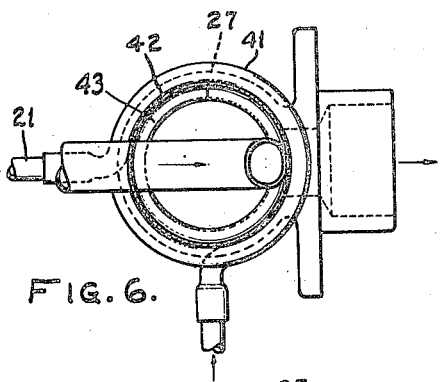
FIG. 6.
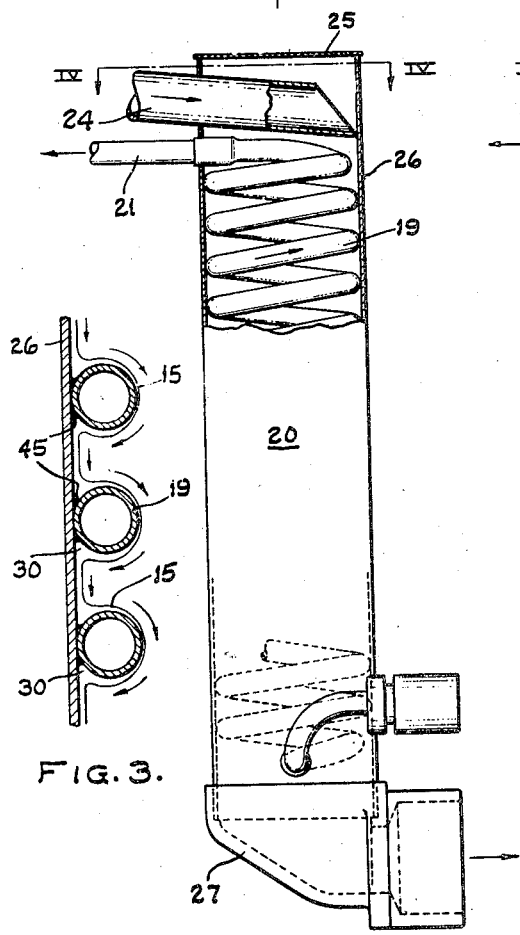
FIG. 3.
FIG. 2.
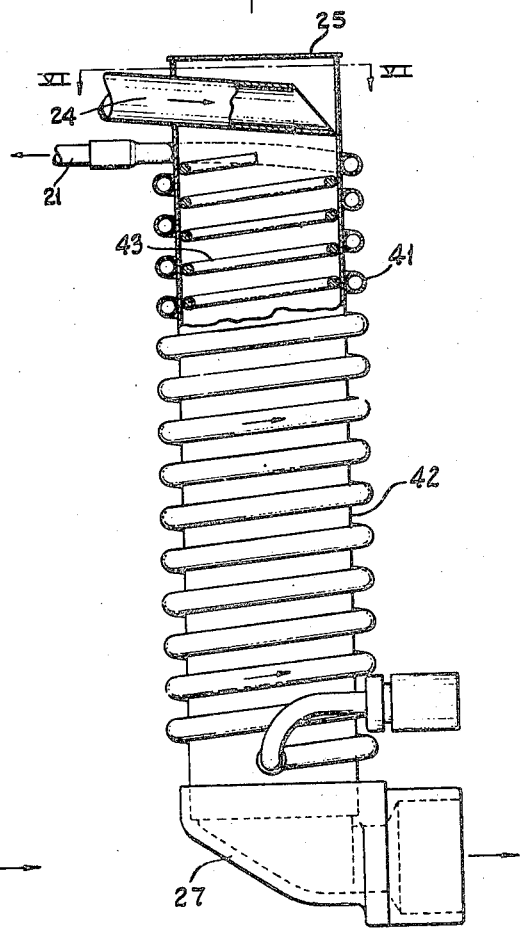
FIG. 5.
INVENTOR
ROGER W. HASTINGS.
BY
ATTORNEY
WITNESSES:

Patented Sept. 13, 1949

2,481,662

UNITED STATES PATENT OFFICE 2,481,662

WATER COOLER

Roger W. Hastings, Longmeadow, Mass., assignor to Westinghouse Electric Corporation, East Pittsburgh, Pa., a corporation of Pennsylvania Application May 6, 1943, Serial No. 485,814

15 Claims. (Cl. 62—141)

This invention relates to refrigerating apparatus and more especially to water coolers.

In water coolers of the spout or bubbler type, about sixty per cent of the refrigerated water is wasted and flows down the drain provided therefor. Such drinking fountains usually employ a heat transfer device for transferring some of the refrigerating effect of the waste water to the relatively warm water supplied to the cooling apparatus. High efficiency heat transfer devices are obviously desirable for this purpose but their use is made difficult because the waste water of water coolers carries debris, such as tobacco, particles of chewing gum, and also larger objects which drop into the catch basin of the water cooler. Such debris would clog the ordinary high efficiency heat transfer units which depend upon small passages for obtaining high degrees of heat transfer.

It is accordingly an object of the invention to provide an efficient unit for transferring heat between two liquids, one of which may carry solid particles of substantial size.

It is a further object of the invention to provide an efficient unit for transferring heat between the waste refrigerated water and the incoming supply water of a water cooler, which unit is suitable for the conditions met in such service.

It is another object of the invention to provide a heat transfer unit which is suitable for the conditions met in drinking fountain operation, which unit is of high efficiency and which is easily cleaned when clogged.

These and other objects are effected by the invention as will be apparent from the following description and claims taken in accordance with the accompanying drawings, forming a part of this application, in which:

Fig. 2 is an enlarged view of the heat transfer unit of this invention with parts broken away;

Fig. 3 is an enlarged portion of the wall of the heat transfer unit of Fig. 2;

Fig. 4 is a section on the line IV—IV of the heat transfer unit of Fig. 2; and

Figs. 5 and 6 are elevational and sectional views, respectively, of a modification of the heat transfer unit of this invention.

Figure 1:
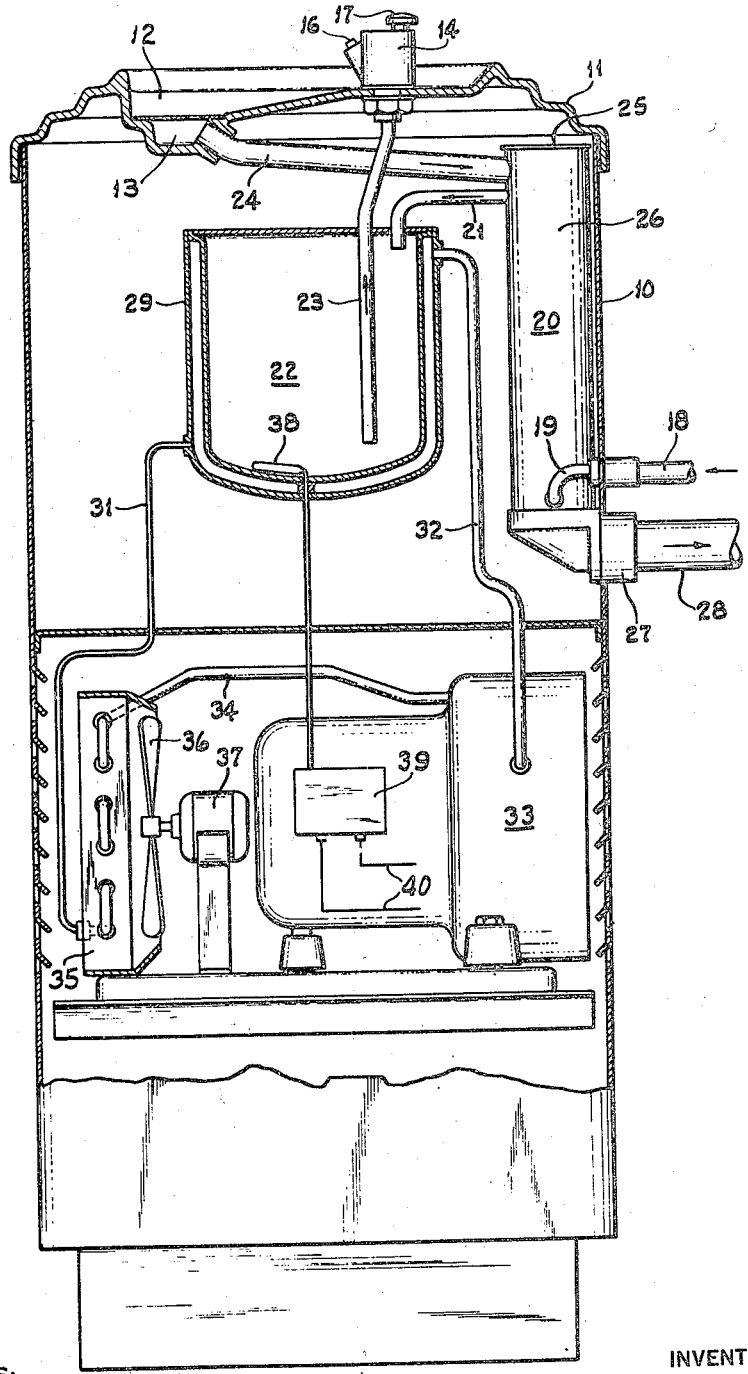
Fig. 1 is a vertical sectional view of a water cooler of the drinking fountain type equipped with the heat transfer unit of this invention.

Referring to the drawings for a description of the invention, the reference numeral 10 designates the outer shell of a water cooler of the bubbler type. Positioned on the outer shell 10 is an ornamental top plate 11 embodying a catch basin 12 and a drain 13 at one edge thereof. A bubbler head 14, comprising a spout 16 and a press-type operating valve 17, is secured on the top plate 11 opposite the drain 13. The drinking fountain is connected to the water supply main (not shown) through a pipe 18. The pipe 18 communicates with the lower end of a metal pipe coiled in a vertical cylindrical helix 19, the consecutive turns of which are spaced apart as shown in Fig. 2. The helix 19 forms one element of the heat transfer unit 20 of this invention. The upper end of the helix 19 communicates with a pipe 21, which in turn communicates with the upper portion of a water storage chamber 22 which is refrigerated in a conventional manner to be described. Another pipe 23 communicates with the lower portion of the chamber 22 and with the bubbler head 14.

When the drinking fountain is used by applying the lips to the stream of water issuing from the spout 16 about sixty per cent of the refrigerated water is wasted and flows into the catch basin 12 and drain 13 and through a tube 24 to the upper interior surface of a vertical metal tube 26, best shown in Fig. 2. The vertical tube 26, which forms another element of the heat transfer unit 20 of this invention, encloses the helical pipe 19, abuts the outer elements thereof, and is secured by solder 45 thereto so that the heat of the relatively warm water in the helical pipe 19 is transmitted to the walls of the tube 26. A disc 25 closes the upper end of the tube 26 and an elbow 27 connects with the lower end of the tube 26 and with the drain pipe 28. Both the elbow 27 and the drain pipe 28 are of sufficient size to carry off the debris contained in the waste water.

The water issuing from the tube 24 is spread out to wet the entire interior surface of the tube 26 by the helically-formed pipe 19 which also tends to guide some of the water downwardly in a helical path. The flow of waste water along the wall of the heat transfer unit 20 is shown in Fig. 3, the waste water being designated by the reference numeral 15. It will be observed that the waste water 15 tends to flow over the entire exposed surface of the helically-coiled pipe 19 and over the exposed inner surface of the tube 26. The flow of the waste water over the pipe 19 includes a short distance of uphill flow over the lower part of the pipe 19 adjacent the tube 26. The area of uphill flow is indicated by the reference numeral 30 in Fig. 3. This uphill flow of the water 15 is caused by the inertia acquired as it flows down the exposed side wall of the pipe 19 and by the capillary attraction between the metal of the heat transfer unit 20 and the water 15. The debris carried by the waste water 15 falls through the central opening of the helix of the pipe 19 and passes through the large elbow 27 to the large drain pipe 28 so that the heat transfer unit is not readily clogged to impair its efficiency or interrupt the flow of the waste water. If the heat exchanger 20 of this invention does become clogged, it is readily made accessible for cleaning by removing the ornamental cover 11 and the disc 25.

The conventional manner in which the chamber 22 is refrigerated will now be described. The chamber 22 is provided with an outer jacket 29 on its side walls and base. Refrigerant liquid is supplied through a capillary tube 31 to the space between the outer jacket 29 and the chamber 22 and refrigerant vapor is withdrawn from said space through a suction tube 32 which, at its lower end, connects to a refrigerant compressor housed in a sealed casing 33 and driven by an electric motor in the casing 33. The compressor and its driving motor are not shown in the drawings. The compressed refrigerant vapor passes through a tube 34 to a condenser 35 wherein it is cooled and liquefied. The condenser 35 is cooled by air from a fan 36 driven by an electric motor 37. The lower portion of the condenser 35 connects with the capillary tube 31. The temperature of the water in the chamber 22 is controlled in a conventional manner by a thermostat 39, the thermosensitive bulb 38 of which is located in the chamber 22. Power for the electric motor is supplied through leads 40.

A modification of the heat transfer unit of this invention is shown in Figs. 5 and 6, in which like parts of the heat transfer unit are indicated by the same reference numerals. In this modification, a metal pipe 41 is wound around a vertical metal tube 42 in a helix and is soldered to the same to effect a good heat transfer. The helically-coiled pipe 41 carries the relatively warm supply water, and the tube 42 carries the waste water, as in the previously-described modification. A helically-coiled wire 43, having spaced-apart turns is located in the tube 42 adjacent the wall thereof and is soldered thereto. The wire 43 forms a baffle which distributes the water in the tube 42 over the interior surface thereof. The waste water running down on the inner surface of the tube 42 absorbs the heat transmitted to the tube 42 by the helically-coiled pipe 41.

It will be apparent from an inspection of the device that the heat transferring capacity of both modifications of the invention is very high because the cold waste water flows rapidly in a thin layer over a large warm surface. The two liquids between which heat is transferred are also in counterflow so that the warmest water entering the helix exchanges heat with the warmest waste water, and the coldest water in the upper coils of the helix exchanges heat with the coldest portion of the waste water in the upper portion of the tube 26. This makes possible a substantially complete exploitation of the difference in temperature between the incoming and the outflowing water. It will be further apparent that the heat exchangers of this invention are relatively short and compact and readily opened for cleaning if clogged.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a drinking fountain, the combination of means for refrigerating a liquid, a spout for discharging refrigerated liquid from said means, a catch basin for receiving wasted portions of said refrigerated liquid, an approximately vertical metal tube communicating with said catch basin in a manner to receive the wasted liquid from said catch basin at an upper portion of the interior wall surface of said tube, said tube having a discharge opening in its lower portion, and means for supplying a liquid to said refrigerating means and for distributing waste liquid which may tend to flow down a portion of the interior wall surface of said tube over a larger portion of said wall surface, said means for supplying liquid to said refrigerating means being in intimate heat exchange relationship with the walls of said tube, the interior passageway of said tube and said discharge opening being so large with respect to the wasted liquid flowing therethrough during normal usage of said fountain that said passageway is not completely filled by said wasted liquid.

2. In a drinking fountain, the combination of means for refrigerating a liquid, a spout for discharging refrigerated liquid from said means, a catch basin for receiving wasted portions of said refrigerated liquid, an approximately vertical metal tube, said tube having a discharge opening in its lower portion, means for conducting the wasted liquid from said catch basin to an upper portion of the interior wall surface of said tube, and means for supplying a liquid to said refrigerating means and distributing waste liquid which may tend to flow down a portion of the interior wall surface of said tube over a larger portion of said wall surface, said means for supplying liquid to said refrigerating means being in intimate heat-exchange relationship with the wall of said tube, the interior passageway of said tube and said discharge opening being so large with respect to the wasted liquid flowing therethrough during normal usage of said fountain that said passageway is not completely filled by said wasted liquid.

3. In a drinking fountain, the combination of apparatus for refrigerating a liquid; a spout for discharging refrigerated liquid from said apparatus; a catch basin for receiving wasted portions of said refrigerated liquid; a metal pipe coiled into a helix having an approximately vertical axis, the coils of said helix being spaced apart, said pipe supplying the liquid to be refrigerated by said apparatus; an approximately vertical tube enclosing said coil and in heat-exchange relationship therewith, said tube having a discharge opening at its lower end; means for conducting the liquid from said catch basin to an upper portion of the inner wall surface of said tube; said tube, helix, and discharge opening, being so large with respect to the quantity of liquid wasted in the ordinary usage of said drinking fountain that said wasted liquid flows substantially only in a layer over the exposed inner surface of the tube and the outer surface of said pipe.

4. In a drinking fountain, the combination of apparatus for refrigerating a liquid; a spout for discharging refrigerated liquid from said apparatus; a catch basin for receiving wasted portions of said refrigerated liquid; a metal pipe coiled into a helix having an approximately vertical axis, the coils of said helix being spaced apart, said pipe supplying the liquid to be refrigerated by said apparatus; an approximately vertical metal tube enclosing said coil and soldered thereto; means for conducting the liquid from said catch basin to an upper portion of the inner wall surface of said tube, said tube having a discharge opening at its lower end; said tube, helix, and discharge opening being so large with respect to the quantity of liquid wasted in the ordinary usage of said drinking fountain that said wasted liquid flows in a thin layer over the exposed inner surface of the tube and the outer surface of said pipe.

5. In a drinking fountain, the combination of means for refrigerating a liquid; a spout for discharging refrigerated liquid from said means; a catch basin for receiving wasted portions of said refrigerated liquid; an approximately vertical metal tube; means for conducting the wasted liquid from said catch basin to an upper portion of the interior wall surface of said tube; means within said tube for distributing liquid flowing down a portion of the interior wall surface of said tube over a larger portion of the said interior wall surface; said tube having a discharge opening at its lower end; and a metal pipe for supplying liquid to said refrigerating means, said pipe being soldered in intimate heat exchange relationship to the walls of said vertical tube, the interior passageway of said tube and said discharge opening being so large that the wasted liquid flowing therethrough during normal usage of said fountain does not completely fill said pasageway.

6. A drinking fountain according to claim 5 wherein the metal pipe is arranged to conduct the liquid upwardly along said tube.

7. In a drinking fountain, the combination of means for refrigerating a liquid; a spout for discharging refrigerated liquid from said means; a catch basin for receiving wasted portions of said refrigerated liquid; an approximately vertical metal tube; means for conducting the wasted liquid from said catch basin to an upper portion of the interior wall surface of said tube; means within said tube for distributing liquid flowing down a portion of the interior wall surface of said tube over a larger portion of the said interior wall surface; a drain near the lower end of said tube; and a conduit for supplying liquid to said refrigerating means, said conduit being in intimate heat-exchange relationship with the walls of said vertical tube, the interior passageway of said tube and drain being so large that the wasted liquid flowing therethrough during normal usage of said fountain does not completely fill said passageway.

8. In a drinking fountain, the combination of a chamber, means for cooling the contents of said chamber, a metal pipe for supplying liquid under pressure to said chamber, a spout connected to said chamber to discharge liquid therefrom, a basin for catching wasted portions of said liquid and debris, said basin having a drain opening of sufficient size to pass said debris, a conduit connected at one end with said drain opening, a vertical metal tube connected with the other end of said conduit in such a manner that water and debris flowing from said conduit impinge on an interior wall surface of said tube, said tube having a discharge opening at its lower end, and metallic baffling means bonded to the interior surface of said tube below the area whereon liquid from said conduit impinges, said baffling means being in the form of a vertical spiral the convolutions of which are spaced apart, said supplying pipe being formed at least in part in a vertical spiral on the surface of said tube below the area whereon liquid from said conduit impinges, said spiral being bonded to said tube, the passageway for the liquid inside of said tube and the discharge opening thereof being so large that the liquid flowing into said catch basin during the normal operation of said fountain does not completely fill said tube.

9. In a drinking fountain, the combination of means for refrigerating a liquid, a spout for discharging refrigerated liquid from said means, a catch basin for receiving wasted portions of said refrigerated liquid and debris, a vessel having a metal wall with an interior surface one portion of which is higher than another portion thereof, means for conducting waste liquid and debris from said catch basin to said higher portion of said wall surface, means for draining said liquid and debris from said lower portion of said wall surface, and means for distributing said waste liquid over said wall surface and for conducting liquid to be refrigerated to said refrigerating means in heat exchange relationship with said wall, said vessel being of an internal volume and said draining means of a capacity such that the liquid wasted in the ordinary usage of said drinking fountain flows substantially only in a layer over said wall surface of the vessel and over said distributing means.

10. In a drinking fountain, the combination of means for refrigerating a liquid, a spout for discharging refrigerated liquid from said means, a catch basin for receiving wasted portions of said refrigerated liquid and debris, a vessel having a metal wall with an interior surface one portion of which is higher than another portion thereof, means for conducting waste liquid and debris from said catch basin to said higher portion of said wall surface, a metallic pipe for conducting liquid to said refrigerating means, said pipe having portions metallically bonded to said wall surface and arranged to distribute said liquid over said surface, and means for draining said liquid and debris from said lower portion of said wall surface, said vessel being of an internal volume and said draining means of a capacity such that the liquid wasted in the ordinary usage of said drinking fountain flows substantially in a layer over said interior surface of the vessel and over said portions of the pipe.

11. In a drinking fountain, the combination of means for refrigerating a liquid, a spout for discharging refrigerated liquid from said means, a catch basin for receiving wasted port'ons of said refrigerated liquid and debris, a vessel having a metal wall with an interior surface one portion of which is higher than another portion thereof, means for conducting waste liquid and debris from said catch basin to said higher portion of said wall surface, a metallic baffle on said wall surface and in heat transfer relationship with said wall and arranged to distribute said waste liquid over said wall surface, means for draining said liquid and debris from said lower portion of said wall surface, and means for conducting liquid to said refrigerating means in heat transfer relationship with said wall, said vessel being of an internal volume and said draining means of a capacity such that the liquid wasted in the ordinary usage of said drinking fountain flows substantially only in a layer over said interior surface of said vessel and over said metallic baffle.

12. In a drinking fountain, the combination of means for refrigerating a liquid, a spout for discharging refrigerated liquid from said means, a catch basin for receiving wasted portions of said refrigerated liquid and debris, a vessel having a metal wall with an interior surface one portion of which is higher than another portion thereof, means for conducting waste liquid and debris from said catch basin to said higher portion of said wall surface, a metallic baffle on said wall surface and in heat transfer relationship with said walls and arranged to distribute said waste liquid over said wall surface, means for draining said liquid and debris from said lower portion of said wall surface, and a metallic pipe for conducting liquid to said refrigerating means, said pipe having portions bonded to the outer surface of said wall, said vessel being of an internal volume and said draining means of a capacity such that the liquid wasted in the ordinary usage of said drinking fountain flows substantially only in a layer over said wall surface of said vessel and over said metallic baffle.

13. In a drinking fountain, the combination of means for refrigerating a liquid, a spout for discharging refrigerated liquid from said means, a catch basin for receiving wasted portions of said refrigerated liquid and debris, a metal tube means having an inner surface, one end of said tube means being higher than the other end thereof, means for conducting waste liquid and debris from said catch basin to the inner surface of the higher end of said tube means, means for draining said liquid and debris from the lower end of said tube means, the inner surface of said tube means having a helical projection extending beyond the remainder of said inner surface into the interior of the tube means, said helical projection having an upper surface which is inclined upwardly towards the center of said tube means to form a trough together with the adjacent portion of the wall of said tube means, said helical projection being pitched downwardly so that at least some of said waste liquid tends to run downwardly in said trough, and pipe means in heat exchange relationship with said tube means, said pipe means being arranged to conduct the liquid to be refrigerated to said refrigerating means.

14. In a drinking fountain, the combination of means for refrigerating a liquid, a spout for discharging refrigerated liquid from said means, a catch basin for receiving wasted portions of said refrigerated liquid and debris, a vessel having a metal wall with an interior surface one portion of which is higher than another portion thereof, conduit means for conducting waste liquid and debris from said catch basin to a higher portion of said surface, conduit means for draining said liquid and debris from a lower portion of said surface, baffle means for distributing said waste liquid over said surface, and conduit means for conducting liquid to said refrigerating means in heat-exchange relationship with the outer surface of said wall, said vessel being of an internal volume and said draining conduit means of such capacity that the liquid wasted in the ordinary usage of said drinking fountain flows substantially only in a layer over said interior wall surface of the vessel and over said baffle means.

15. In a drinking fountain, the combination of means for refrigerating a liquid, a spout for discharging refrigerated liquid from said means, a catch basin for receiving wasted portions of said refrigerated liquid and debris, a generally vertical metal tube, conduit means for conducting waste liquid and debris from said catch basin to the interior of the upper portion of said tube, conduit means for draining said liquid and debris from the lower portion of said tube, baffle means extending helically around the inner surface of said tube and projecting into the interior thereof, said baffle means having an upper surface at least a portion of which is inclined upwardly towards the center of said tube to form a trough, said baffle means being pitched downwardly so that at least some of said waste liquid tends to run downwardly in said trough, and a conduit in heat-exchange relationship with the exterior surface of said tube, said conduit being arranged to conduct liquid to be refrigerated to said refrigerating means.

ROGER W. HASTINGS.

REFERENCES CITED

The following references are of record in the file of this patent:

UNITED STATES PATENTS

| Number | Name | Date |
| --- | --- | --- |
| 1,945,287 | Monroe | Jan. 30, 1934 |
| 2,009,949 | William | July 30, 1935 |
| 2,010,504 | Askin | Aug. 6, 1935 |
| 2,183,509 | Smith | Dec. 12, 1939 |
| 2,301,546 | Hubbell | Nov. 10, 1942 |

FOREIGN PATENTS

| Number | Country | Date |
| --- | --- | --- |
| 108,116 | Great Britain | July 27, 1917 |
| 15,034 | Denmark | Aug. 28, 1911 |